(12) United States Patent
Liu

(10) Patent No.: US 11,304,081 B2
(45) Date of Patent: Apr. 12, 2022

(54) DATA TRANSMISSION METHOD AND DATA TRANSMISSION APPARATUS

(71) Applicant: ZTE CORPORATION, Guangdong (CN)

(72) Inventor: Zhuang Liu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 15/931,266

(22) Filed: May 13, 2020

(65) Prior Publication Data

US 2020/0275295 A1 Aug. 27, 2020

Related U.S. Application Data

(63) Continuation of application No. PCT/CN2018/111228, filed on Oct. 22, 2018.

(30) Foreign Application Priority Data

Nov. 17, 2017 (CN) .......................... 201711147211.8

(51) Int. Cl.
*H04W 28/02* (2009.01)
*H04W 24/10* (2009.01)
(Continued)

(52) U.S. Cl.
CPC ........... *H04W 24/10* (2013.01); *H04L 1/0026* (2013.01); *H04L 1/1819* (2013.01); *H04W 88/18* (2013.01)

(58) Field of Classification Search
None
See application file for complete search history.

(56) References Cited

U.S. PATENT DOCUMENTS

2012/0057560 A1 3/2012 Park et al.
2015/0372789 A1 12/2015 Fan et al.
(Continued)

FOREIGN PATENT DOCUMENTS

CN 105703891 A 6/2016
CN 106559858 A 4/2017
(Continued)

OTHER PUBLICATIONS

First Office Action for CN Appl. No. 201711147211.8 dated Mar. 3, 2021 (with English translation, 11 pages).
(Continued)

*Primary Examiner* — Scott M Sciacca
(74) *Attorney, Agent, or Firm* — Foley & Lardner LLP

(57) ABSTRACT

Provided is a data transmission method and a data transmission apparatus. The method includes: obtaining measurement results of channel transmission qualities of multiple channels, where a data duplication transmission function is configured on the multiple channels and is used for indicating an establishment of multiple connections with a terminal on the multiple channels, and the multiple connections are used for simultaneous transmissions of duplicated data on the multiple channels; determining, according to the obtained measurement results, whether to activate the data duplication transmission function; and performing a data transmission with the terminal on the multiple channels according to a determination result. A problem, in relevant technology, that the transmission resource consumption is large when the data transmission is performed in the manner of duplication transmission is solved, and the effects of improving link transmission quality and reducing transmission resource consumption are achieved.

20 Claims, 8 Drawing Sheets

(51) Int. Cl.
*H04L 1/22* (2006.01)
*H04L 1/18* (2006.01)
*H04W 76/15* (2018.01)
*H04L 1/00* (2006.01)
*H04W 88/18* (2009.01)

(56) References Cited

U.S. PATENT DOCUMENTS

2016/0065700 A1    3/2016  Yi et al.
2020/0119864 A1*   4/2020  Xu .............................. H04L 1/08
2020/0163140 A1*   5/2020  Mochizuki ............ H04L 5/0098

FOREIGN PATENT DOCUMENTS

| CN | 107147479 A | 9/2017 |
| CN | 107241164 A | 10/2017 |
| CN | 107342851 A | 11/2017 |
| EP | 2 685 657 A1 | 1/2014 |

OTHER PUBLICATIONS

Extended European Search Report for EP Appl. No. 18878417.7, dated Nov. 20, 2020.
Huawei et al.: "Activating and deactivating packet duplication", 3GPP Draft; R2-1703529 3rd Generation Partnership Project (3GPP), RAN WG2, Spokane, Washington, Mar. 24, 2017 (12 Pages).
Huawei et al.: "Dynamic activation/deactivation of packet duplication", 3GPP Draft; R2-1704835 3rd Generation Partnership Project (3GPP), RAN WG2, Hangzhou, China, May 14, 2017 (2 pages).
Nokia et al.: "Duplication Impacts to MAC" 3GPP TSG-RAN WG2 Meeting #97bis; R2-1702639; Apr. 7, 2017; Spokane, USA (4 pages).
ZTE: "Consideration on the activation/deactivation of data duplication for CA", 3GPP Draft; R2-1704660, 3rd Generation Partnership Project (3GPP), RAN WG2, Hangzhou, China; May 5, 2017 (3 Pages).
International Search Report and Written Opinion of the International Searching Authority for PCT/CN2018/111228 dated Dec. 29, 2018 (8 pages).
CATT, "Discussion on support of multi-connectivity for option 2 and option 3-1", 3GPP TSG RAN WG3 Meeting #Adhoc R3-170125, Spokane, Washington, Jan. 12, 2017 (7 pages).
Ericsson, "Further aspects of data duplication in PDCP layer", 3GPP TSG-RAN WG2 #97 Tdoc R2-1700834, Athens, Greece, Feb. 3, 2017 (5 pages).
First Office Action on JP 2020-526950 dated Apr. 22, 2021 (10 pages, including English Translation).
Huawei and HiSilicon, "Enhancements for DL packet duplication", 3GPP TSG-RAN2 #99Bis R2-1710766, Prague, Sep. 29, 2017 (5 pages).
Search Report and Written Opinion on SG 11202004528W dated Apr. 27, 2021 (11 pages).
CATT: "Discussion on support of multi-connectivity for option 2 and option 3-1" 3GPP TSG RAN WG3 Meeting #Adhoc; R3-170125; Jan. 19, 2016; Spokane, Washington, USA (5 pages).
First Office Action for KR Appl. No. 10-2020-7017353, dated Aug. 17, 2021 (with English translation 11 pages).
Huawei et al.: "Activating and deactivating packet duplication" 3GPP TSG-RAN2 #97bis; R2-1703529; Apr. 7, 2017; Spokane, Washington, USA (4 pages).
Huawei et al.: "Enhancements for DL packet duplication" 3GPP TSG-Ran2 #99Bis; R2-1710766; Oct. 13, 2017; Prague, Czech Republic (3 pages).

* cited by examiner

DATA TRANSMISSION METHOD AND DATA TRANSMISSION APPARATUS

CROSS REFERENCE TO RELATED APPLICATIONS

This application claims the benefit of priority under 35 U.S.C. § 120 as a continuation of PCT Patent Application No. PCT/CN2018/111228, filed on Oct. 22, 2018, which claims priority to Chinese patent application no. 201711147211.8, filed on Nov. 17, 2017, the disclosure of each of which is incorporated herein by reference in its entirety.

TECHNICAL FIELD

The present disclosure relates to the field of communications and in particular, to a data transmission method and a data transmission apparatus.

BACKGROUND

The 5th-generation mobile communication technology (5G) network architecture has innovation and networking flexibility, and a base station on a wireless access network side in the 5G network is separated into two functional entities, i.e., a centralized unit (CU) and a distributed unit (DU). One base station includes one CU and one or more DUs. In the CU/DU separated network architecture, a delay-insensitive network function is placed in a first network element (e.g., a CU), and a delay-sensitive network function is placed in a second network element (e.g., a DU). The first network element and the second network element perform transmission through an ideal and/or non-ideal fronthaul network, as shown in FIG. 1.

In an existing CU/DU separated architecture, the CU/DU higher-layer separation solution (as shown in FIG. 2) is: placing a packet data convergence protocol (PDCP) layer and a layer above the PDCP layer in the CU, and placing a radio link control (RLC) layer and a layer below the RLC layer in the DU. In the CU/DU architecture, a terminal may establish multiple connections in a carrier aggregation manner with multiple carriers in one DU, or may establish multiple connections with multiple DUs under one CU. In order to improve the reliability of data transmission, the CU may send copies of the same data to different connections when sending traffic-bearing data to the terminal. Accordingly, when the terminal sends the traffic-bearing data to the CU, the terminal may send copies of the same data to different connections. Such type of data transmission is called duplication transmission. In this way, even if the terminal does not receive, on one link, the data sent by the network side, the terminal may also receive the duplicated data on another link (the network side receives data sent by the terminal in a similar way), which can greatly improve the reliability of receiving traffic data by the terminal and reduce the packet loss rate.

Downlink data transmission is taken as an example to illustrate the duplication transmission.

As shown in FIG. 3, the terminal establishes multiple connections with multiple carriers in one DU in the carrier aggregation manner. Traffic of the terminal is born on two data transmission channels established between the CU and the DU. In FIG. 3, two F1 data transmission channels are provided, and the CU sends the duplicated data (PDCP protocol data unit 1 (PDU1) in FIG. 3) to the two data transmission channels. After the data is received, the DU sends the data on different transmission channels to the terminal through different logical channels. Radio resource control (RRC), PDCP and the like in FIG. 3 respectively correspond to new radio (NR) RRC, NR PDCP and the like in FIG. 2.

As shown in FIG. 4, the terminal establishes multiple connections with multiple DUs under one CU in a manner of multi-DU connection. The CU is connected to each different DU through a respective F1 data channel. The CU sends the duplicated data (PDCP PDU1 in FIG. 4) to two DUs. After the data is received, the DUs send the data to the terminal.

However, a problem exists that the transmission resource consumption is large when the data transmission is performed in the manner of duplication transmission in relevant technology.

SUMMARY

Embodiments of the present disclosure provide a data transmission method and a data transmission apparatus for at least solving the problem, in relevant technology, that the transmission resource consumption is large when the data transmission is performed in the manner of duplication transmission.

An embodiment of the present disclosure provides a data transmission method. The data transmission method includes: obtaining measurement results of channel transmission qualities of multiple channels, where a data duplication transmission function is configured on the multiple channels and is used for indicating an establishment of multiple connections with a terminal on the multiple channels, and the multiple connections are used for simultaneous transmissions of duplicated data on the multiple channels; determining, according to the obtained measurement results, whether to activate the data duplication transmission function; and performing data transmission with the terminal on the plurality of channels according to a determination result.

An embodiment of the present disclosure provides a data transmission apparatus. The data transmission apparatus includes: an obtaining module, which is arranged to obtain measurement results of channel transmission qualities of multiple channels, where a data duplication transmission function is configured on the multiple channels and is used for indicating an establishment of multiple connections with a terminal on the multiple channels, and the multiple connections are used for simultaneous transmissions of duplicated data on the multiple channels; a determination module, which is arranged to determine, according to the obtained measurement results, whether to activate the data duplication transmission function; and a transmission module, which is arranged to perform a data transmission with the terminal on the multiple channels according to a determination result of the determination module.

An embodiment of the present disclosure further provides a CU. The CU includes any data transmission apparatus described above.

An embodiment of the present disclosure further provides a DU. The DU includes any data transmission apparatus described above.

An embodiment of the present disclosure further provides a storage medium. The storage medium includes stored programs which, when being executed, perform any data transmission method described above.

An embodiment of the present disclosure further provides a processor. The processor is arranged to execute programs which, when being executed, perform any data transmission method described above.

Through the present disclosure, the data duplication transmission function is configured on the multiple channels, and it is determined whether to activate the data duplication transmission function according to the measurement results of the channel transmission qualities of the multiple channels, so that the data duplication transmission function is activated when necessary. Thus, the link transmission quality is guaranteed and the waste of transmission resources is avoided at the same time. Therefore, the problem in relevant technology that the transmission resource consumption is large when the data transmission is performed in the manner of duplication transmission can be solved, and the effects of improving link transmission quality and reducing transmission resource consumption are achieved.

BRIEF DESCRIPTION OF DRAWINGS

The drawings described herein are used to provide a further understanding of the present disclosure, and form a part of the present application. The exemplary embodiments and descriptions thereof in the present disclosure are used to explain the present disclosure and do not limit the present disclosure in any improper way. In the drawings.

DETAILED DESCRIPTION

The present disclosure will be described hereinafter in detail with reference to the drawings and in conjunction with embodiments. It is to be noted that if not in collision, the embodiments and features therein in the present application may be combined with each other.

It is to be noted that the terms "first", "second" and the like in the description, claims and above drawings of the present disclosure are used to distinguish between similar objects and are not necessarily used to describe a particular order or sequence.

Embodiment 1

Figure 1:
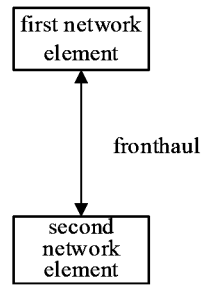
FIG. 1 is a schematic diagram of an interface between a first network element and a second network element in relevant technology.
Figure 2:
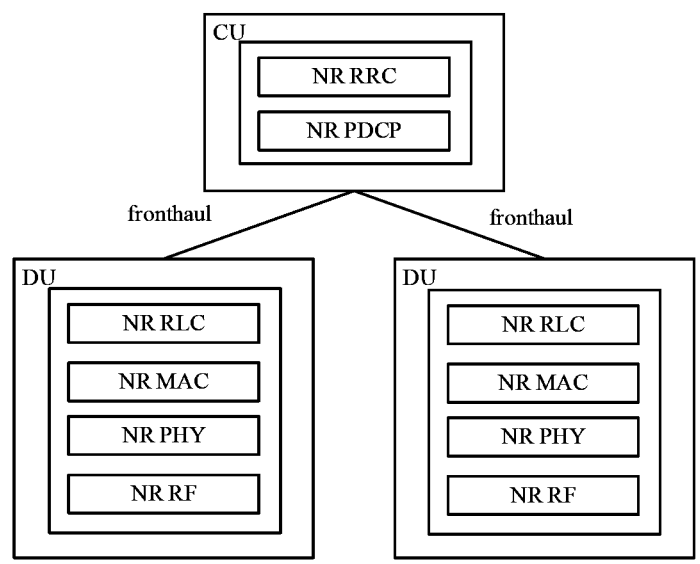
FIG. 2 is a schematic diagram of a CU-DU higher-layer separation solution in relevant technology.
Figure 3:
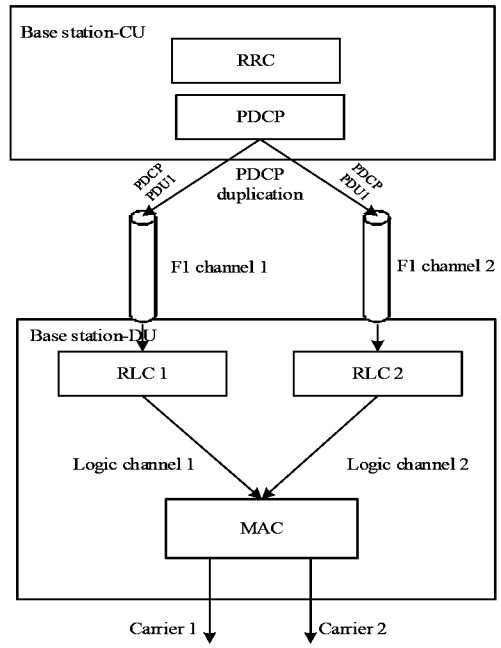
FIG. 3 is a schematic diagram of duplication transmission in a carrier aggregation manner in relevant technology.
Figure 4:
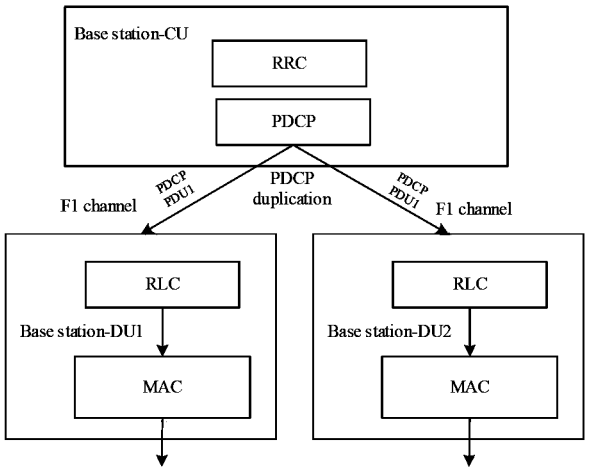
FIG. 4 is a schematic diagram of duplication transmission based on connections with multiple DUs under one CU in relevant technology.
Figure 5:
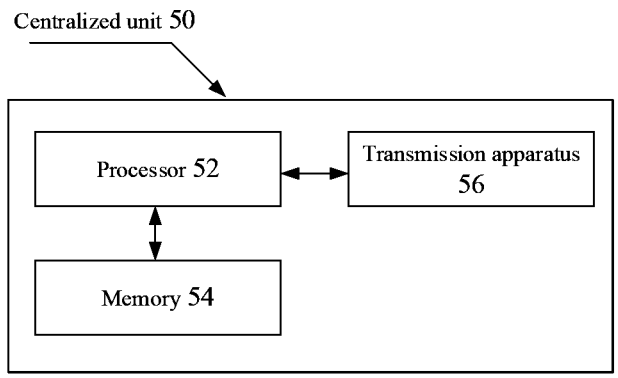
FIG. 5 is a hardware structural block diagram of a CU for a data transmission method according to an embodiment of the present disclosure.

Embodiments directed to method provided by the embodiment 1 of the present application may be executed in a CU, a DU or other similar computing apparatuses. Taking a method to be executed by a mobile terminal as an example, FIG. 5 is a hardware structural block diagram of a CU for a data transmission method according to an embodiment of the present disclosure. As shown in FIG. 5, a CU 50 may include one or more (only one is shown in the figure) processors 52 (the processor 52 may include, but is not limited to, a microprocessor such as a microcontroller unit (MCU), a programmable logic device such as a field programmable gate array (FPGA) or other processing apparatuses), a memory 54 used for storing data, and a transmission apparatus 56 used for implementing a communication function. It should be understood by those skilled in the art that the structure shown in FIG. 5 is merely illustrative and not intended to limit the structure of the electronic apparatus described above. For example, the CU 50 may include more or less components than the components shown in FIG. 5, or may have a configuration different from the configuration shown in FIG. 5.

The memory 54 may be configured to store software programs and modules of application software, such as program instructions/modules corresponding to the data transmission method in the embodiment of the present disclosure. The one or more processors 52 execute the software programs and modules stored in the memory 54 to perform functional applications and data processing, that is, to implement the method described above. The memory 54 may include a high-speed random access memory, or may include a nonvolatile memory such as one or more magnetic storage apparatuses, flash memories or other nonvolatile solid-state memories. In some examples, the memory 54 may further include memories that are remotely disposed with respect to the processors 52. These remote memories may be connected to the CU 50 via a network. Examples of the preceding network include, but are not limited to, the Internet, an intranet, a local area network, a mobile communication network and a combination thereof.

The transmission apparatus 56 is arranged to receive or send data via a network. Specific examples of such a network may include a wireless network provided by a communication provider of the CU 50. In one example, the transmission apparatus 56 includes a network interface controller (NIC), which may be connected to other network devices via a base station and thus be capable of communicating with the Internet. In one example, the transmission apparatus 56 may be a radio frequency (RF) module, which is arranged to communicate with the Internet wirelessly.

In relevant technology, data transmission is performed in the manner of duplication transmission. Through the duplication technology, the network side sends the duplicated data on the links of different connections to the terminal to provide the terminal with reliability of receiving data. However, the duplication technology needs to consume extra transmission resources. For example, when one of the links is of very good quality, the data duplication transmission function may be deactivated and transmission may be performed on only one link to save transmission resources. For another example, when two links are of good quality, the data duplication transmission function is deactivated and different data is sent on the two links to improve the data rate of terminal traffic. For another example, when a link is of very poor quality, the data duplication transmission function is deactivated. It is meaningless to send the duplicated data on the link since the quality of the link is poor. Thus, the data duplication transmission function may be activated or deactivated according to determination of the downlink transmission quality.

In the CU/DU separated architecture, copies of the same data are sent by the CU to different links. The CU cannot determine the downlink quality of the DU in time, so it is difficult for the CU to determine whether to activate or deactivate the data duplication transmission function of the data duplication transmission function. Therefore, in the CU/DU separated situation, it needs to be considered how to determine whether to activate or deactivate the duplication transmission function on multiple links connected with the terminal.

Figure 6:
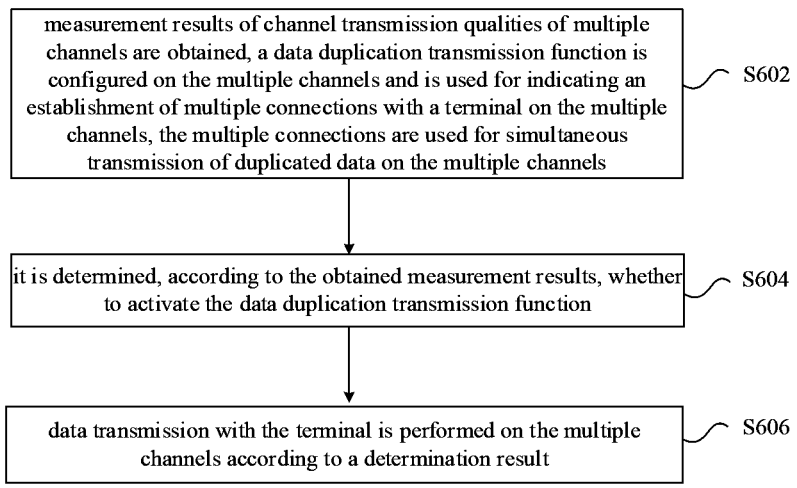
FIG. 6 is a flowchart of a data transmission method according to an embodiment of the present disclosure.

An embodiment provides a data transmission method to be executed in the CU or DU described above. FIG. 6 is a flowchart of a data transmission method according to an embodiment of the present disclosure. As shown in FIG. 6, the method includes the steps described below.

In S602, measurement results of channel transmission qualities of multiple channels are obtained. A data duplication transmission function is configured on the multiple channels and is used for indicating an establishment of multiple connections with a terminal on the multiple channels. The multiple connections are used for simultaneous transmissions of duplicated data on the multiple channels.

In S604, it is determined, according to the obtained measurement results, whether to activate the data duplication transmission function.

In S606, data transmission with the terminal is performed on the multiple channels according to a determination result.

Through the above steps, the data duplication transmission function is configured on the multiple channels, and it is determined whether to activate the data duplication transmission function according to the measurement results of the channel transmission qualities of the multiple channels, so that the data duplication transmission function is activated when necessary. Thus, the link transmission quality is guaranteed and the waste of transmission resources is avoided at the same time. Therefore, the problem, in relevant technology, that the transmission resource consumption is large when the data transmission is performed in the manner of duplication transmission is solved, link transmission quality is improved and transmission resource consumption is reduced.

Optionally, the above steps may, but may not necessarily, be performed by a CU, a DU or the like.

Optionally, the step S606 may include: in a case that the determination result indicates that the data duplication transmission function is activated, performing transmissions of the duplicated data with the terminal on the multiple connections corresponding to the multiple channels. That is, the duplicated data is sent to the terminal or the duplicated data sent by the terminal is received on the multiple channels corresponding to the multiple connections.

Optionally, two cases may be included when the determination result indicates that the data duplication transmission function is activated: the data duplication transmission function is activated before the determination is performed and then is kept on; and the data duplication transmission function is not activated before the determination is performed and then is activated.

Optionally, the step S606 may further include: in a case that the determination result indicates that the data duplication transmission function is not activated, determining one channel from the multiple channels for performing the data transmission with the terminal.

Optionally, two cases may be included when the determination result indicates that the data duplication transmission function is not activated: the data duplication transmission function is activated before the determination is performed and then is deactivated; and the data duplication transmission function is deactivated before the determination is performed and then is kept off. Optionally, in the case that the determination result indicates that the data duplication transmission function is not activated, one channel may be determined from the multiple channels in many manners for performing the data transmission with the terminal.

In an optional manner, a first channel on which a channel transmission quality is higher than a specified threshold is obtained, and it is determined, according to the first channel, a channel for performing the data transmission with the terminal. For example, the threshold may be pre-specified, and in a case where only one channel (i.e., the channel having the highest channel transmission quality) has a channel transmission quality higher than the threshold, the one channel may be determined as the channel for performing the data transmission with the terminal. When multiple channels have channel transmission qualities higher than the threshold, one of the multiple channels may be determined as the channel for performing the data transmission with the terminal. For another example, a channel having the highest (best) channel transmission quality among the multiple channels may be selected and determined as the channel for performing the data transmission with the terminal.

In another optional manner, one of the multiple channels may be per-specified as a default channel (second channel), and in the case that the determination result indicates that the data duplication transmission function is not activated, the default channel is determined as the channel for performing the data transmission with the terminal.

Optionally, in the step S604, it may be determined in many manners whether to activate the data duplication transmission function. For example, in a case that the measurement results indicate that the channel transmission qualities of all of the multiple channels meet a preset condition, the data duplication transmission function may be determined to be activated; or in a case that the measurement results indicate that the channel transmission quality of at least one of the multiple channels does not meet the preset condition, the data duplication transmission function may be determined not to be activated. The preset condition includes that: the channel transmission quality is higher than a first preset threshold and lower than a second preset threshold. The second preset threshold is greater than the first preset threshold.

Description is made below. For a channel having a channel transmission quality higher than the second preset threshold, the quality of this link is good. Therefore, the data duplication transmission function may be deactivated, and data is transmitted only on one link. For a channel having a channel transmission quality lower than the first preset threshold, the quality of this link is very poor. It is meaningless to send the duplicated data on this link, and the data duplication transmission function may be considered to be deactivated. In an optional manner, when a channel transmission quality of a channel is lower than the first preset threshold, the channel may also be considered to be ignored, and data duplication transmission (simultaneous transmissions of the duplicated data) may be performed on channels other than the channel among the multiple channels.

Optionally, in the step S602, the measurement results may be obtained in many manners. In an optional manner, the CU may receive the measurement results reported by one or more DUs. The measurement results are obtained after the one or more DUs measure the channel transmission qualities of the multiple channels. For example, for the data duplication transmission function for multiple connections between the same DU and the terminal, the CU may receive the measurement results of the channel qualities of multiple channels measured and sent by the DU. For another example, for the data duplication transmission function for multiple connections between different DUs under the same CU and the terminal, the CU may receive the measurement results of the channel qualities of respective channels measured and sent by different DUs. In another optional manner, the DU may measure the channel transmission qualities of multiple channels and obtain the measurement results.

Optionally, after the step S604, the method may include: after the CU obtains the determination result, the CU may send a first indication message for indicating whether to activate the data duplication transmission function to the DU. The DU may clear a buffer related to the multiple connections according to the received first indication message, or notify the terminal according to the indication message whether to activate the data duplication transmission function. The method may further include that: after the DU obtains the determination result, the DU may send a second indication message for indicating whether to activate the data duplication transmission function to the CU, so that the CU performs a corresponding operation according to the second indication message, for example, the CU sends the duplicated data to the multiple channels, and for another example, the CU stops sending the duplicated data to the multiple channels.

Optionally, the above measurement result may be one of "link transmission quality abnormality indication" or "link transmission quality recovery indication", or may, but may not necessarily, be one or more of: a channel quality indication (CQI) measurement result, a sounding reference signal (SRS) measurement result, a downlink buffer data transmission delay measurement result, a radio link control (RLC) retransmission number measurement result, and a hybrid automatic repeat request (HARD) retransmission number measurement result.

On the basis of the above embodiments and preferred embodiments and in order to describe the entire process interaction of the solution, a data transmission method is provided in a preferred embodiment. The method is described below in detail. It is to be noted that a downlink data transmission is taken as an example for description of data transmission in the preferred embodiment. Accordingly, channel transmission quality of a channel is channel transmission quality of a downlink channel. Uplink data transmission is similar to the downlink data transmission, so repetition is not made herein.

The preferred embodiment is applicable to the case where the network side determines whether to activate or deactivate the data duplication transmission function (i.e., the above-mentioned data duplication transmission function) when the base station is in the CU/DU separated situation and multiple connections are provided between the terminal and the network side.

In an optional manner, the data transmission method in the preferred embodiment may include the steps described below.

In a step 1, the DU measures a transmission quality of a downlink channel (such measurement may, but may not necessarily, include one or more of: a CQI measurement report reported by a terminal, an SRS measurement, a downlink buffer data transmission delay, an RLC retransmission number, an HARQ retransmission number measurement, etc.).

In a step 2, if the data duplication transmission function is configured in the multiple connections between the same DU and the terminal, the DU may determine, according to the measured transmission qualities of respective different links connected with the terminal, whether to activate the data duplication transmission function on the multiple links between the DU and the terminal. Moreover, the DU sends a "duplication indication" message (functioning as the foregoing second indication message) to the CU. The determination result of duplication is included in the message and is used for notifying the CU whether the data duplication transmission function is activated or deactivated. The CU receives the "duplication indication" message reported by the DU. If the message indicates that the data duplication transmission function is activated, the CU may send the duplicated data to the multiple links connected with the terminal; and if the message indicates that the data duplication transmission function is deactivated, the CU stops sending the duplicated data to the multiple links connected with the terminal, and the process ends.

If the data duplication transmission function is configured in the multiple connections between different DUs under the same CU and the terminal, the DUs report measurement results of downlink channel transmission qualities to the CU. Each reported measurement result may be one of "link transmission quality abnormality indication" or "link transmission quality recovery indication", or may, but may not necessarily, be one or more of: a CQI measurement result, an SRS measurement result, a downlink buffer data transmission delay measurement result, an RLC retransmission number measurement result, and an HARQ retransmission number measurement result.

In a step 3, the CU receives the results of the downlink channel transmission qualities of the terminal reported by the DUs, and determines, according to quality of each link, whether to activate or deactivate the data duplication transmission function. If the data duplication transmission function is determined to be activated, the CU may send the duplicated data to the multiple links connected with the terminal. If the data duplication transmission function is determined to be deactivated, the CU stops sending the duplicated data to the multiple links connected with the terminal. Optionally, the CU may send a "duplication indication" message to the DU. The determination result of duplication is included in the message and is used for notifying the DU whether the data duplication transmission function is activated or deactivated on the network side.

The data transmission method in the preferred embodiment will be described below in conjunction with specific examples.

Example 1

Figure 7:
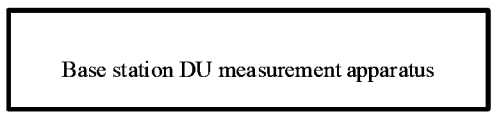
FIG. 7 is a schematic diagram of a DU downlink channel quality measurement apparatus according to a preferred embodiment of the present disclosure.

FIG. 7 is a schematic diagram of a DU downlink channel quality measurement apparatus according to a preferred embodiment of the present disclosure. The apparatus is used for determining downlink duplication on the network side.

As shown in FIG. 7, the measurement apparatus is used for measurement of downlink channel transmission quality. Such measurement may, but may not necessarily, include one or more of: a CQI measurement report, an SRS measurement, a downlink buffer data transmission delay, an RLC retransmission number measurement, an HARQ retransmission number measurement, and the like. The measurement result is used for the DU to directly determine whether to activate or deactivate the data duplication transmission function of the multiple links bearing traffic of the terminal; or the measurement result is reported to the CU and is used for the CU to determine whether to activate or deactivate the data duplication transmission function of the multiple links bearing traffic of the terminal.

Example 2

Figure 8:
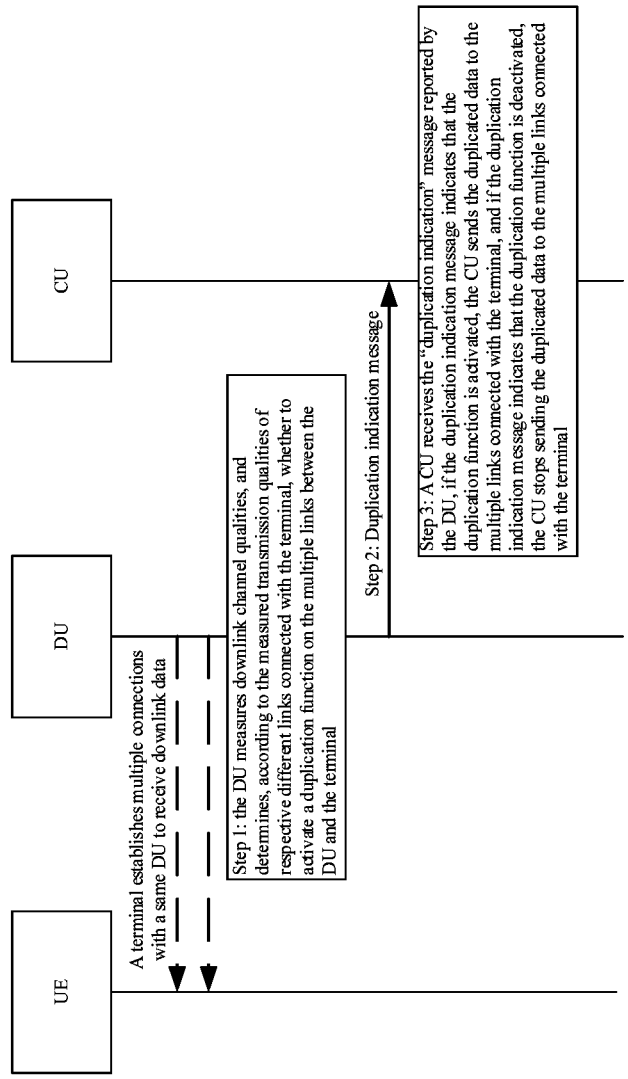
FIG. 8 is a flowchart 1 of duplication transmission based on multiple connections with one DU according to a preferred embodiment of the present disclosure.

FIG. 8 is a flowchart 1 of duplication transmission based on multiple connections with one DU according to a preferred embodiment of the present disclosure. In the example, the terminal establishes multiple connections with the same DU and receives downlink data. The DU determines whether to activate or deactivate the data duplication transmission function. As shown in FIG. 8, the process includes the steps described below.

In a step 1, the DU measures downlink channel qualities, and determines, according to the measured transmission qualities of respective different links connected with the terminal, whether to activate a duplication function (i.e., data duplication transmission function) on the multiple links between the DU and the terminal.

In a step 2, the DU sends a "duplication indication" message to the CU.

The determination result of the duplication function is included in the "duplication indication" message, and is used for notifying the CU whether the duplication function is activated or deactivated.

In a step 3, the CU receives the "duplication indication" message reported by the DU. If the duplication indication message indicates that the duplication function is activated, the CU sends the duplicated data to the multiple links connected with the terminal; and if the duplication indication message indicates that the duplication function is deactivated, the CU stops sending the duplicated data to the multiple links connected with the terminal.

The CU receives the "duplication indication" message reported by the DU. If the message indicates that the duplication function is activated, the CU may send the duplicated data to the multiple links connected with the terminal; and if the message indicates that the duplication function is deactivated, the CU stops sending the duplicated data to the multiple links connected with the terminal.

Example 3

Figure 9:
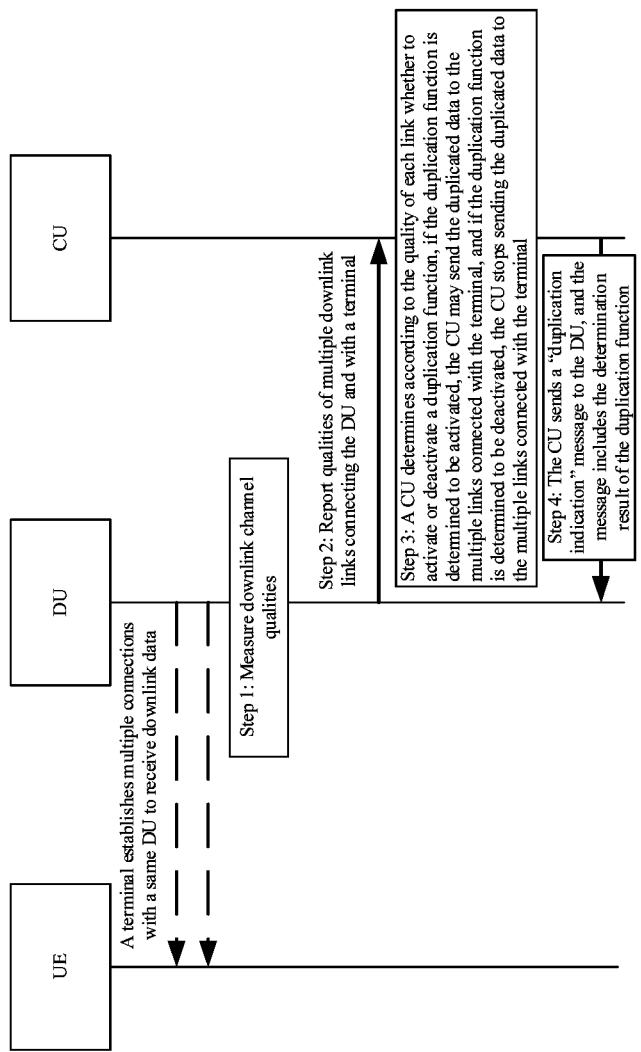
FIG. 9 is a flowchart 2 of duplication transmission based on multiple connections with one DU according to a preferred embodiment of the present disclosure.

FIG. 9 is a flowchart 2 of duplication transmission based on multiple connections with one DU according to a preferred embodiment of the present disclosure. In the example, the terminal establishes multiple connections with the same DU and receives downlink data. The CU determines whether to activate or deactivate the data duplication transmission function. As shown in FIG. 9, the process includes the steps described below.

In a step 1, the DU measures downlink channel transmission qualities.

In a step 2, the DU reports quality measurement results of multiple downlink links between the terminal and the DU to the CU.

In a step 3, the CU determines, according to the quality of each link, whether to activate or deactivate a duplication function. If the duplication function is determined to be activated, the CU may send the duplicated data to the multiple links connected with the terminal. If the duplication function is determined to be deactivated, the CU stops sending the duplicated data to the multiple links connected with the terminal.

After the CU receives downlink channel transmission quality results of the terminal reported by the DU, the step 3 is performed.

In a step 4, the CU sends a "duplication indication" message to the DU. The determination result of duplication is included in the message and is used for notifying the DU whether the duplication function is activated or deactivated on the network side.

The step 4 is an optional step.

Example 4

Figure 10:
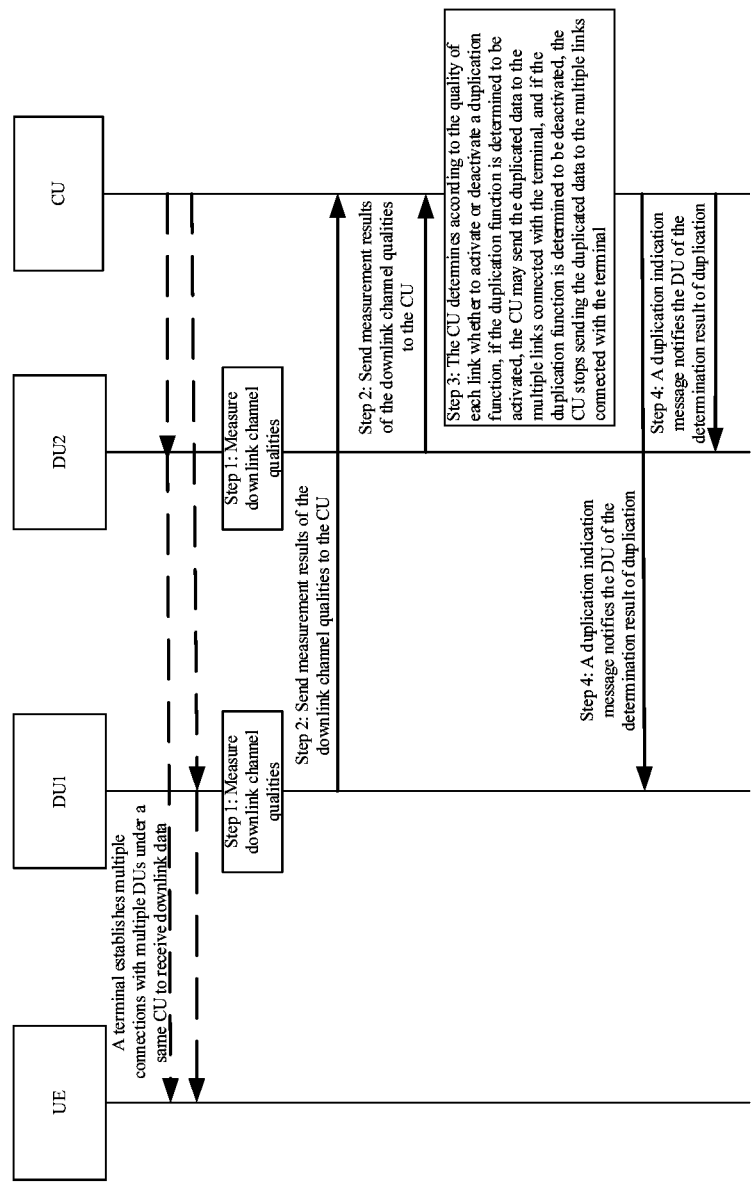
FIG. 10 is a flowchart of duplication transmission based on multiple connections with multiple DUs under one CU according to a preferred embodiment of the present disclosure.

FIG. 10 is a flowchart of duplication transmission based on multiple connections with multiple DUs under one CU according to a preferred embodiment of the present disclosure. In the example, the terminal establishes multiple connections with multiple DUs under the same CU and receives downlink data. The CU determines whether to activate or deactivate the data duplication transmission function. As shown in FIG. 10, the process includes the steps described below.

In a step 1, the terminal establishes multiple connections with multiple DUs under the same CU, and different DUs measure downlink channel transmission qualities of the terminal.

In a step 2, the DUs report the measurement results of the downlink channel transmission qualities to the CU.

In a step 3, the CU receives the downlink channel transmission quality results of the terminal reported by different DUs, and determines, according to the quality of each link, whether to activate or deactivate a duplication function. If the duplication function is determined to be activated, the CU sends the duplicated data to the multiple links connected with the terminal. If the duplication function is determined to be deactivated, the CU stops sending the duplicated data to the multiple links connected with the terminal.

In a step 4, the CU sends a "duplication indication" message to the multiple DUs. The determination result of the duplication function is included in the message and is used for notifying the DUs whether the duplication function is activated or deactivated on the network side.

The step 4 is an optional step.

With the above technical solution of the preferred embodiments of the present disclosure, the CU or the DU determines, according to the measurement results of the channel transmission qualities of the multiple channels for multiple connections, whether the data duplication transmission function needs to be activated or deactivated, thereby saving transmission resources. Further, when the CU performs the determination, the CU may learn about the downlink quality of the DU in time through the interaction with the DU, and then determines whether to activate or deactivate the data duplication transmission function. The problem, in the relevant technology, that the transmission resource consumption is large when the data transmission is performed in the manner of duplication transmission is solved, and the effects of improving link transmission quality and reducing transmission resource consumption are achieved.

From the description of the embodiment described above, it will be apparent to those skilled in the art that the method in the embodiments described above may be implemented by software plus a necessary general-purpose hardware platform, or may of course be implemented by hardware. However, in many cases, the former is a preferred implementation mode. Based on this understanding, the solutions provided by the present disclosure substantially, or the part contributing to the existing art, may be embodied in the form of a software product. The computer software product is stored in a storage medium (such as a read-only memory (ROM)/random access memory (RAM), a magnetic disk or an optical disk) and the storage medium includes several instructions for enabling a terminal device (which may be a mobile phone, a computer, a server, a network device, or the like) to perform the method according to each embodiment of the present disclosure.

Embodiment 2

A data transmission apparatus, a CU and a DU are further provided in an embodiment. The apparatus and various units are used for implementing the above-mentioned embodiments and preferred embodiments. What has been described will not be repeated. As used below, the term "module" may be software, hardware or a combination thereof capable of implementing predetermined functions. The apparatus in the embodiment described below is preferably implemented by software, but implementation by hardware or by a combination of software and hardware is also possible and conceived.

Figure 11:
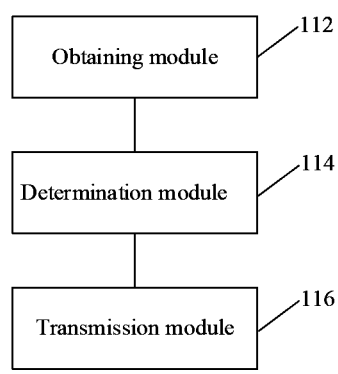
FIG. 11 is a structural block diagram 1 of a data transmission apparatus according to an embodiment of the present disclosure.

FIG. 11 is a structural block diagram 1 of a data transmission apparatus according to an embodiment of the present disclosure. As shown in FIG. 11, the apparatus includes an obtaining module 112, a determination module 114 and a transmission module 116.

The obtaining module 112 is arranged to obtain measurement results of channel transmission qualities of multiple channels. A data duplication transmission function is configured on the multiple channels and is used for indicating an establishment of multiple connections with a terminal on the multiple channels. The multiple connections are used for simultaneous transmission of the duplicated data on the multiple channels.

The determination module 114 is connected to the obtaining module 112, and is arranged to determine, according to the obtained measurement results, whether to activate the data duplication transmission function.

The transmission module 116 is connected to the obtaining module 114, and is arranged to perform a data transmission with the terminal on the multiple channels according to a determination result of the determination module.

Optionally, the transmission module 116 may include a first transmission unit. The first transmission unit is described below.

The first transmission unit is arranged to: in a case that the determination result indicates that the data duplication transmission function is activated, perform transmissions of the duplicated data with the terminal on the multiple connections corresponding to the multiple channels.

Optionally, the transmission module 116 may further include a second transmission unit. The first transmission unit is described below.

The second transmission unit is arranged to: in a case that the determination result indicates that the data duplication transmission function is not activated, determine a channel from the multiple channels, for performing the data transmission with the terminal.

Optionally, the second transmission unit is further arranged to: in the case that the determination result indicates that the data duplication transmission function is not activated, obtain a first channel on which a channel transmission quality is higher than a specified threshold, and determine, according to the first channel, a channel for performing the data transmission with the terminal; or obtain a pre-specified second channel, and determine the second channel as the channel for performing the data transmission with the terminal.

Optionally, the determination module 114 may include: a determining unit which is described below.

The determining unit is arranged to: in a case that the measurement results indicate that the channel transmission quality of all of the multiple channels meet a preset condition, determine to activate the data duplication transmission function; or in a case that the measurement results indicate that the channel transmission quality of at least one of the multiple channels does not meet the preset condition, determine not to activate the data duplication transmission function. The preset condition includes that: the channel transmission quality is higher than a first preset threshold and lower than a second preset threshold. The second preset threshold is greater than the first preset threshold.

Optionally, the obtaining module 112 may include: a receiving unit which is described below. The receiving unit is arranged to receive the measurement results reported by one or more DUs. The measurement results are obtained after the one or more DUs measure the channel transmission qualities of the multiple channels.

Optionally, the obtaining module 112 may include: a measurement unit and an obtaining unit which are described below.

The measurement unit is arranged to measure the channel transmission qualities of the multiple channels.

The obtaining unit is connected to the measurement unit and is arranged to obtain the measurement results.

Figure 12:
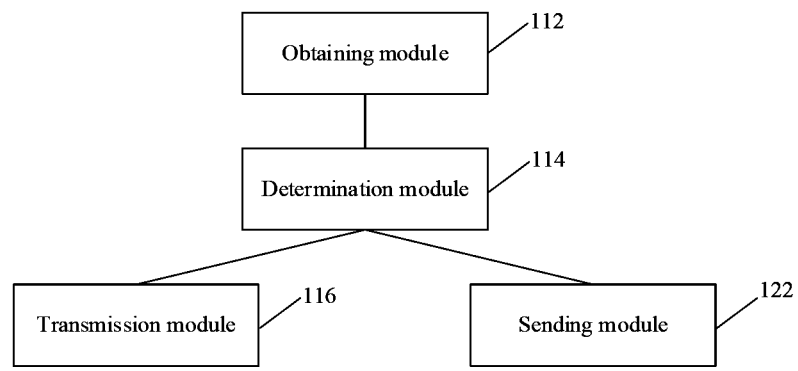
FIG. 12 is a structural block diagram 2 of a data transmission apparatus according to an embodiment of the present disclosure.

FIG. 12 is a structural block diagram 2 of a data transmission apparatus according to an embodiment of the present disclosure. As shown in FIG. 12, the apparatus further includes a sending module 122 in addition to all of the modules shown in FIG. 11.

The sending module 122 is connected to the determination module 114 and is arranged to: after the determination result is obtained, send a first indication message for indicating whether to activate the data duplication transmission function to a DU; or after the determination result is obtained, send a second indication message for indicating whether to activate the data duplication transmission function to a CU.

Figure 13:
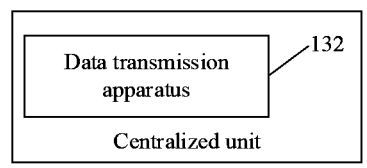
FIG. 13 is a structural block diagram of a CU according to an embodiment of the present disclosure.

FIG. 13 is a structural block diagram of a CU according to an embodiment of the present disclosure. As shown in FIG. 13, the DU includes the data transmission apparatus 132 described in any above-mentioned embodiment.

Optionally, the CU may further include: a receiving unit, which is arranged to receive the measurement results reported by one or more DUs. The measurement results are obtained after the one or more DUs measure the channel transmission qualities of the multiple channels.

Optionally, the receiving unit may be located in the obtaining module of the data transmission apparatus of the CU.

Optionally, the CU may further include: a sending module, which is arranged to: after the determination result is obtained, send an indication message for indicating whether to activate the data duplication transmission function to a DU.

Figure 14:
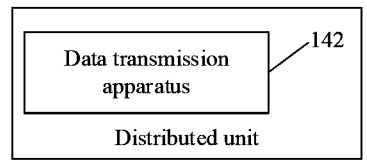
FIG. 14 is a structural block diagram of a DU according to an embodiment of the present disclosure.

FIG. 14 is a structural block diagram of a DU according to an embodiment of the present disclosure. As shown in FIG. 14, the DU includes the data transmission apparatus 142 described in any above-mentioned embodiment.

Optionally, the DU may further include: a measurement unit, which is arranged to measure the channel transmission qualities of the multiple channels; and an obtaining unit, which is arranged to obtain the measurement results.

Optionally, the measurement unit and the obtaining unit may be located in the obtaining module of the data transmission apparatus of the DU.

Optionally, the DU may further include: a sending module, which is arranged to: after the determination result is obtained, send an indication message for indicating whether to activate the data duplication transmission function to a CU.

It is to be noted that the various modules described above may be implemented by software or hardware. Implementation by hardware may, but may not necessarily, be performed in the following manners: the various modules described above are located in a same processor, or the various modules described above are located in different processors in any combination form.

Embodiment 3

An embodiment of the present disclosure further provides a storage medium. The storage medium includes stored programs which, when being executed, perform any of above-mentioned methods.

Optionally, in the embodiment, the storage medium may be arranged to store program codes for performing steps described below.

In S1, measurement results of channel transmission qualities of multiple channels are obtained. A data duplication transmission function is configured on the multiple channels and is used for indicating an establishment of multiple connections with a terminal on the multiple channels. The multiple connections are used for simultaneous transmission of the duplicated data on the multiple channels.

In S2, it is determined, according to the obtained measurement results, whether to activate the data duplication transmission function.

In S3, a data transmission with the terminal is performed on the multiple channels according to a determination result.

Optionally, the storage medium is further arranged to store program codes for performing the step described below.

The step of performing the data transmission with the terminal on the multiple channels according to the determination result includes the step described below.

In a case that the determination result indicates that the data duplication transmission function is activated, transmissions of the duplicated data with the terminal are performed on the multiple connections corresponding to the multiple channels.

Optionally, the storage medium is further arranged to store program codes for performing the step described below.

The step of performing the data transmission with the terminal on the multiple channels according to the determination result includes the step described below.

In a case that the determination result indicates that the data duplication transmission function is not activated, a channel is determined from the multiple channels, for performing the data transmission with the terminal.

Optionally, the storage medium is further arranged to store program codes for performing the step described below.

The step of determining the channel from the multiple channels for performing the data transmission with the terminal in the case that the determination result indicates that the data duplication transmission function is not activated includes the step described below.

In S1, a first channel on which a channel transmission quality is higher than a specified threshold is obtained, and it is determined, according to the first channel, a channel for performing the data transmission with the terminal.

Or in S2, a pre-specified second channel is obtained, and the second channel is determined as the channel for performing the data transmission with the terminal.

Optionally, the storage medium is further arranged to store program codes for performing the step described below.

The step of determining, according to the obtained measurement results, whether to activate the data duplication transmission function includes the step described below.

In S1, in a case that the measurement results indicate that the channel transmission quality of all of the multiple channels meet a preset condition, the data duplication transmission function is determined to be activated.

Or in S2, in a case that the measurement results indicate that the channel transmission quality of at least one of the multiple channels does not meet the preset condition, the data duplication transmission function is determined not to be activated.

The preset condition includes that: the channel transmission quality is higher than a first preset threshold and lower than a second preset threshold. The second preset threshold is greater than the first preset threshold.

Optionally, the storage medium is further arranged to store program codes for performing the step described below.

The step of obtaining the measurement results of the channel transmission qualities of the multiple channels includes the step described below.

In S1, a CU receives the measurement results reported by one or more DUs. The measurement results are obtained after the one or more DUs measure the channel transmission qualities of the multiple channels.

Or in S2, a DU measures the channel transmission qualities of the multiple channels; and the DU obtains the measurement results.

Optionally, the storage medium is further arranged to store program codes for performing the step described below.

The step of obtaining the measurement results of the channel transmission quality of the multiple channels includes the step described below.

After the step of determining, according to the obtained measurement results, whether to activate the data duplication transmission function, the method further includes the step described below.

In S1, after a CU obtains the determination result, the CU sends a first indication message for indicating whether to activate the data duplication transmission function to a DU.

Or in S2, after a DU obtains the determination result, the DU sends a second indication message for indicating whether to activate the data duplication transmission function to a CU.

Optionally, in an embodiment, the storage medium may include, but is not limited to, a USB flash disk, a read-only memory (ROM), a random access memory (RAM), a mobile hard disk, a magnetic disk, an optical disk or another medium capable of storing the program codes.

An embodiment of the present disclosure further provides a processor. The processor is configured to execute programs which, when being executed, perform the steps of any above-mentioned method.

Optionally, in an embodiment, the programs described above are used for performing the steps described below.

In S1, measurement results of channel transmission qualities of multiple channels are obtained.

A data duplication transmission function is configured on the multiple channels and is used for indicating an establishment of multiple connections with a terminal on the multiple channels. The multiple connections are used for simultaneous transmission of the duplicated data on the multiple channels.

In S2, it is determined, according to the obtained measurement results, whether to activate the data duplication transmission function.

In S3, a data transmission with the terminal is performed on the multiple channels according to a determination result.

Optionally, in an embodiment, the programs described above are used for performing the step described below.

The step of performing the data transmission with the terminal on the multiple channels according to the determination result includes the step described below.

In a case that the determination result indicates that the data duplication transmission function is activated, transmissions of the duplicated data with the terminal are performed on the multiple connections corresponding to the multiple channels.

Optionally, in an embodiment, the programs described above are used for performing the step described below.

The step of performing the data transmission with the terminal on the multiple channels according to the determination result includes the step described below.

In a case that the determination result indicates that the data duplication transmission function is not activated, a channel is determined from the multiple channels, for performing the data transmission with the terminal.

Optionally, in an embodiment, the programs described above are used for performing the step described below.

The step of determining the channel from the multiple channels for performing the data transmission with the terminal in the case that the determination result indicates that the data duplication transmission function is not activated includes the step described below.

In S1, a first channel on which a channel transmission quality is higher than a specified threshold is obtained, and it is determined, according to the first channel, a channel for performing the data transmission with the terminal.

Or in S2, a pre-specified second channel is obtained, and the second channel is determined as the channel for performing the data transmission with the terminal.

Optionally, in an embodiment, the programs described above are used for performing the step described below.

The step of determining, according to the obtained measurement results, whether to activate the data duplication transmission function includes the step described below.

In S1, in a case that the measurement results indicate that the channel transmission qualities of all of the multiple channels meet a preset condition, the data duplication transmission function is determined to be activated.

Or in S2, in a case that the measurement results indicate that the channel transmission quality of at least one of the multiple channels does not meet the preset condition, the data duplication transmission function is determined not to be activated.

The preset condition includes that: the channel transmission quality is higher than a first preset threshold and lower than a second preset threshold. The second preset threshold is greater than the first preset threshold.

Optionally, in an embodiment, the programs described above are used for performing the step described below.

The step of obtaining the measurement results of the channel transmission qualities of the multiple channels includes the step described below.

In S1, a CU receives the measurement results reported by one or more DUs. The measurement results are obtained after the one or more DUs measure the channel transmission qualities of the multiple channels.

Or in S2, a DU measures the channel transmission qualities of the multiple channels; and the DU obtains the measurement results.

Optionally, in an embodiment, the programs described above are used for performing the step described below.

The step of obtaining the measurement results of the channel transmission qualities of the multiple channels includes the step described below.

After the step of determining, according to the obtained measurement results, whether to activate the data duplication transmission function, the method further includes the step described below.

In S1, after a CU obtains the determination result, the CU sends a first indication message for indicating whether to activate the data duplication transmission function to a DU.

Or in S2, after a DU obtains the determination result, the DU sends a second indication message for indicating whether to activate the data duplication transmission function to a CU.

Optionally, for specific examples in the embodiment, reference may be made to the examples described in the above-mentioned embodiments and optional embodiments, and repetition will not be made in the embodiment.

Apparently, it should be understood by those skilled in the art that each of the above-mentioned modules or steps of the present disclosure may be implemented by a general-purpose computing apparatus, the modules or steps may be concentrated on a single computing apparatus or distributed on a network composed of multiple computing apparatuses, and alternatively, the modules or steps may be implemented by program codes executable by the computing apparatus, so that the modules or steps may be stored in a storage apparatus and executed by the computing apparatus. In some circumstances, the illustrated or described steps may be executed in sequences different from those described herein, or the modules or steps may be made into various integrated circuit modules separately, or multiple modules or steps therein may be made into a single integrated circuit module for implementation. In this way, the present disclosure is not limited to any specific combination of hardware and software.

The above are only preferred embodiments of the present disclosure and are not intended to limit the present disclosure, and for those skilled in the art, the present disclosure may have various modifications and variations. Any modifications, equivalent substitutions, improvements and the like within the principle of the present disclosure shall fall within the scope of the present disclosure.

What is claimed is:

1. A data transmission method, comprising:
obtaining, by a centralized unit (CU), measurement results of channel transmission qualities of a plurality of channels from one or more distributed units (DUs), the channel transmission qualities measured by the one or more DUs, wherein a data duplication transmission function is configured on the plurality of channels to support transmission of duplicated data on the plurality of channels;
determining, by the CU, according to the obtained measurement results, whether to activate the data duplication transmission function; and
performing, by the CU, a data transmission with a terminal on the plurality of channels according to the determination,
wherein each of the measurement results comprises a hybrid automatic repeat request (HARQ) retransmission number.

2. The data transmission method of claim 1, wherein the performing the data transmission with the terminal on the plurality of channels according to the determination comprises:
in a case that the data duplication transmission function is activated, performing transmissions of the duplicated data with the terminal on the plurality of channels.

3. A non-transitory storage medium, comprising stored programs which, when executed, perform the data transmission method of claim 2.

4. The data transmission method of claim 1, wherein the performing the data transmission with the terminal on the plurality of channels according to the determination comprises:
in a case that the data duplication transmission function is not activated, determining a channel from the plurality of channels to perform the data transmission with the terminal.

5. A non-transitory storage medium, comprising stored programs which, when executed, perform the data transmission method of claim 4.

6. The data transmission method of claim 1, further comprising:
receiving, by the CU from the one or more DUs, an indication of whether to activate the data duplication transmission function.

7. A non-transitory storage medium, comprising stored programs which, when executed, perform the data transmission method of claim 6.

8. The data transmission method of claim 1, wherein each of the measurement results further comprises a channel quality indication (CQI).

9. A non-transitory storage medium, comprising stored programs which, when executed, perform the data transmission method of claim 8.

10. A non-transitory storage medium, comprising stored programs which, when executed, perform the data transmission method of claim 1.

11. A data transmission apparatus, comprising:
at least one processor of a centralized unit (CU), configured to;
obtain measurement results of channel transmission qualities of a plurality of channels from one or more distributed units (DUs), the channel transmission qualities measured by the one or more DUs, wherein a data duplication transmission function is configured on the plurality of channels to support transmission of duplicated data on the plurality of channels;
determine, according to the obtained measurement results, whether to activate the data duplication transmission function; and
perform a data transmission with a terminal on the plurality of channels according to the determination,
wherein each of the measurement results comprises a hybrid automatic repeat request (HARQ) retransmission number.

12. The data transmission apparatus of claim 11, wherein the at least one processor is configured to: in a case that the data duplication transmission function is activated, perform transmission of the duplicated data with the terminal on the plurality of channels.

13. The data transmission apparatus of claim 11, wherein the at least one processor is configured to: in a case that the data duplication transmission function is not activated, determine a channel from the plurality of channels to perform the data transmission with the terminal.

14. The data transmission apparatus of claim 11, wherein each of the measurement results further comprises a channel quality indication (CQI).

15. The data transmission apparatus of claim 7, wherein the at least one processor is configured to receive, from the one or more DUs, an indication of whether to activate the data duplication transmission function.

16. A centralized unit (CU) comprising:
at least one processor configured to;
obtain measurement results of channel transmission qualities of a plurality of channels from one or more distributed units (DUs), the channel transmission qualities measured by the one or more DUs, wherein a data duplication transmission function is configured on the plurality of channels to support transmission of duplicated data on the plurality of channels;
determine, according to the obtained measurement results, whether to activate the data duplication transmission function; and
perform a data transmission with the terminal on the plurality of channels according to the determination,
wherein each of the measurement results comprises a hybrid automatic repeat request (HARQ) retransmission number.

17. The CU of claim 16, wherein the at least one processor is configured to: in a case that the data duplication transmission function is activated, perform transmission of the duplicated data with the terminal on the plurality of channels.

18. The CU of claim 16, wherein the at least one processor is configured to: in a case that the data duplication transmission function is not activated, determine a channel from the plurality of channels to perform the data transmission with the terminal.

19. The CU of claim 16, wherein each of the measurement results further comprises a channel quality indication (CQI).

20. The CU of claim 16, wherein the at least one processor is configured to receive, from the one or more DUs, an indication of whether to activate the data duplication transmission function.

* * * * *

UNITED STATES PATENT AND TRADEMARK OFFICE
CERTIFICATE OF CORRECTION

| | |
|---|---|
| PATENT NO. | : 11,304,081 B2 |
| APPLICATION NO. | : 15/931266 |
| DATED | : April 12, 2022 |
| INVENTOR(S) | : Zhuang Liu |

It is certified that error appears in the above-identified patent and that said Letters Patent is hereby corrected as shown below:

In the Claims

In Claim 15, Column 18, Line 28, please delete "7" and insert -- 11 --

Signed and Sealed this
Fourth Day of April, 2023

Katherine Kelly Vidal
*Director of the United States Patent and Trademark Office*